United States Patent [19]

Qüis et al.

[11] 4,340,707
[45] Jul. 20, 1982

[54] LIQUID, UV-HARDENABLE COATING AGENT AND BINDER

[75] Inventors: Peter Qüis, Darmstadt-Neu-Kranichstein; Theodor Schroth, Trebur, both of Fed. Rep. of Germany

[73] Assignee: Röhm GmbH, Darmstadt, Fed. Rep. of Germany

[21] Appl. No.: 198,045

[22] Filed: Oct. 17, 1980

[30] Foreign Application Priority Data

Nov. 10, 1979 [DE] Fed. Rep. of Germany ....... 2945549

[51] Int. Cl.³ .......................... C08F 20/38; C08F 2/50
[52] U.S. Cl. ................................. 526/289; 204/159.22; 204/159.23; 427/54.1; 428/424.4; 428/514; 560/152
[58] Field of Search ............................... 526/289, 286

[56] References Cited

U.S. PATENT DOCUMENTS

| | | | |
|---|---|---|---|
| 2,759,913 | 8/1956 | Hulse | 528/341 |
| 3,661,744 | 5/1972 | Kehr | 204/159.14 |
| 3,716,466 | 2/1973 | Hook | 526/289 X |
| 4,045,416 | 8/1977 | Robson | 204/159.23 |
| 4,049,745 | 9/1977 | Schuster et al. | 204/159.22 |
| 4,200,762 | 4/1980 | Schmidle | 560/26 |

FOREIGN PATENT DOCUMENTS

| | | |
|---|---|---|
| 2346424 | 4/1974 | Fed. Rep. of Germany ...... 528/271 |
| 2533125 | 2/1977 | Fed. Rep. of Germany . |
| 2737406 | 2/1979 | Fed. Rep. of Germany . |

OTHER PUBLICATIONS

Tatemichi, H., Chem. Economy and Eng. Review, vol. 10, No. 9, (Sep. 1978), pp. 37–42.
Erickson, J. G., J. Polym. Sci. A1, vol. 4, pp. 519–528, (1966).
Wegler, R. Chem. Berichte, 530, pp. 527–531, (1948).

Primary Examiner—C. A. Henderson
Attorney, Agent, or Firm—Curtis, Morris & Safford

[57] ABSTRACT

What is disclosed are a liquid coating and binding agent, hardenable under the influence of ultraviolet radiation, comprising an oligomer of the formula $$[(CH_2=CHCOO)_m ROOCC_2H_4]_2 S$$

or $$[(CH_2=CHCOO)_m ROOCC_2H_4 S]_p R',$$

and a method for its preparation by the reaction of hydrogen sulfide or of a polymercaptan of the formula $$R'(SH)_p$$

with a polyacrylic acid ester of the formula $$(CH_2=CHCOO)_{m+1} R.$$

5 Claims, No Drawings

LIQUID, UV-HARDENABLE COATING AGENT AND BINDER

The present invention relates to a liquid coating and binding agent which is hardenable under the influence of ultraviolet radiation, and to methods of making the same.

The invention lies in the field of liquid coating agents and binders which are hardenable by ultraviolet (UV) radiation. Binders of this type are used in printing inks, lacquers, and other coating mixtures because they have a number of advantages in comparison with conventional coating mixtures which contain a solvent. Since they are free of organic solvents and contain only liquid compounds of high boiling point as binders, they are odorless, do not create a fire hazard, and require no apparatus for the removal of vapors on hardening.

Known binders of this type are unsaturated oligomers which are characterized as styrene-free polyester resins, urethane-acrylates, and epoxy-acrylates. Urethane acrylates are formed in the reaction of polyisocyanates with hydroxyalkyl acrylates. In an analogous fashion, low molecular weight epoxy resins can be reacted with acrylic acid to form epoxy acrylates. In all cases, oligomers having a molecular weight having an order of magnitude of 1000 or more and having one or more polymerizable carbon-carbon double bonds per molecule are obtained. Under the influence of ultraviolet radiation in the presence of suitable accelerators, hardening occurs by polymerization of the unsaturated groups.

The known UV-hardenable binders have disadvantages which limit their use. For the large part, they are solid or highly viscous resins which cannot be used alone as binders: they must be used together with liquid low molecular weight monomers. A further disadvantage is their relatively high price, which is attributable to the use of expensive starting materials. Some of these resins are not completely colorless or they gradually yellow in the hardened condition, which can be disruptive when they are used as a clear lacquer, for instance.

Thus, there has been a search in the past for other types of reactions with which unsaturated oligomers can be prepared in a simple manner. Certain prior art describes the polyaddition of compounds with several reactive hydrogen atoms to compounds having several activated double bonds. Among the compounds with several reactive hydrogen atoms are included those which contain two or more amino, amido, hydroxy, or mercapto groups, or have an activated hydrogen atom bound to a carbon atom. As compounds having several activated carbon-carbon double bonds, principally acrylic derivatives of polyfunctional compounds, for example diesters of glycols or diamides of diamines, are mentioned. In general, the starting materials are employed in equimolar ratios so that linear or branched polymers without unsaturated groups are formed. Only when a stoichiometric excess of the unsaturated component is present can unsaturated polymerizable oligomers also be formed according to the principles of this method.

An example of oligomers of this sort are the radiation-hardenable addition products prepared in the prior art by the Michael-addition of amines onto plurally unsaturated acrylic compounds, for which the stochiometric ratio is so chosen that on the average one amine molecule is added to every molecule of the multiply unsaturated acrylic compound. The goal of this method is not oligomerization, but the introduction of tertiary amine groups which are supposed to exercise an advantageous influence on polymerization behavior. The prior art expressly warns against the reaction of higher functional amines, particularly those having higher molecular weights, with a stochiometric excess of the polyacrylic compound, since the products obtained are for the most part solid and thus can only be used with difficulty. Thus, numerous unsaturated liquid oligomers are not accessible using this reaction principle.

The present invention has as its object the preparation of liquid coating agents and binders, hardenable by ultraviolet radiation and having a viscosity advantageous for technical uses, from easily accessible starting materials, and wherein a high content of unsaturated groups permits attaining a rapid and complete hardening by ultraviolet radiation. The binder should be colorless and should not yellow after hardening. Further requirements for the use of a radiation-hardenable binder are lack of odor and a low volatility or complete lack of volatility.

The coating agents and binders disclosed and claimed herein satisfy these requirements. By limitation to a narrow molecular weight region, they are liquid at room temperature and are of relatively low viscosity. The low viscosity is attributable, inter alia, to the relatively non-polar character of the compounds; more strongly polar oligomers containing hydroxyl, amino, amido, or urethane groups, which groups develop strong reciprocal intermolecular forces by hydrogen bond formation or by dipole effects, are of higher viscosity or are solid.

The good hardenability by ultraviolet radiation is based on a low double bond equivalent weight. This term is defined herein as the quotient of the molecular weight divided by the number of unsaturated groups per molecule. In case the coating agent and binder comprises a mixture of several of the compounds of the formulas given herein, the quotient is determined from the weight average molecular weight and the average content of double bonds calculated therefrom. The average double bond equivalent weight is less than 500 and is preferably between 120 and 250.

The new coating agents and binders according to the invention are prepared by the addition of hydrogen sulfide or of a polymercaptan (inclusive of bis-mercaptans) of the formula

$$R'(SH)_p,$$

where p is an integer from 2 to 4, to a polyacrylic compound of the formula

$$(CH_2=CHCOO)_{m+1}R,$$

where m is an integer from 1 to 3, respectively to form a product of the formula

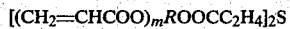

$$[(CH_2=CHCOO)_m ROOCC_2H_4]_2 S$$

and

$$[(CH_2=CHCOO)_m R'OOCC_2H_4S]_p R'.$$

In these formulas, R' is a p-valent aliphatic hydrocarbon group, or is two or more of such aliphatic hydrocarbon groups joined pairwise by an ester group to form an ester or polyester, and has a molecular weight from 28 to 600. R is an (m+1)-valent aliphatic group having 2 to 12 carbon atoms and is an aliphatic hydrocarbon group or two or more such groups joined pairwise by an oxygen atom to form an ether or polyether. Those compounds in which R is a single aliphatic hydrocarbon group are preferred.

Hydrogen sulfide is the preferred component of the formation of the new oligomers. Since it is rapidly and completely bound in the reaction with the polyacrylic compound under the influence of a basic catalyst, the reaction product has no odor of hydrogen sulfide, at least if, after the reaction, it is subjected to a vacuum treatment for some time while warm.

Di-functional or poly-functional mercaptans used as components for the formation of the oligomers have the advantage, in comparison with hydrogen sulfide, that they can be dosed more easily and more exactly, but they have the disadvantage of higher price. Examples of suitable bis- and poly-mercaptans are: dithioglycol; butylene-dithioglycol; glycol-dimercaptoacetate; glycol-dimercaptopropionate; trimethylolethane-trithioglycolate; trimethylolethane-trimercaptopropionate; trimethylolpropane-trithioglycolate; trimethylolpropane-trimercaptopropionate; pentaerythritol-tetrathioglycolate; and pentaerythritoltetramercaptopropionate.

The groups R' have a molecular weight of at least 28 and at most 600. In the latter case, they may be polyester chains, for example. It can happen that not all of the mercapto groups of a higher-functional mercaptan react with an unsaturated acrylic group in the formation of the oligomer. In this case, the group R' still contains one or more free mercapto groups.

The formation of the oligomers takes place under mild conditions under the influence of basic catalysts. Reaction temperatures of 20° C.–70° C. are in general highly satisfactory. As basic catalysts, for example 0.05–1 percent of sodium hydroxide or potassium hydroxide (in alcoholic solution), by weight of the reaction mixture, can be used, or tertiary aliphatic amines such as triethyl amine or tributyl amine can be added. It is advantageous to neutralize the catalyst after the reaction using an equivalent amount of an acid such as phosphoric acid or, in the case of amines of low boiling point, to evaporate the amines by degassing in vacuum. For the reaction, the polyacrylic compound is preferably introduced into the reaction vessel and gaseous hydrogen sulfide, or the mercaptan, is gradually added at the reaction temperature. In this working method, there is always an excess of the polyacrylic compound present so that the mercapto groups can be absorbed rapidly by the unsaturated groups of the polyacrylic compound. Only as the reaction advances will the situation more often occur that a mercapto group reacts with an acrylic group of an already formed oligomer molecule. In addition to the oligomers represented by the formula given earlier, as a rule a certain amount of higher oligomers is found. Often the reaction product contains several different oligomers represented by the formula.

The polyacrylic compounds of the formula $(CH_2=CH-CO-O)_{m+1}R$ are esters of acrylic acid with divalent to tetravalent aliphatic alcohols or ether alcohols having 2 to 12 carbon atoms, preferably alkanols or alkanol ethers. To this group belong ethylene glycol, 1,2-propylene glycol, 1,2- or 1,4-butyleneglycol, di- tri-, and tetra-ethylene glycol, glycerine, trimethylol propane, pentaerythritol, and others. The polyfunctional acrylic esters which are obtainable in commerce are, as technical products, often mixtures of different esters. In the esters of tri- or higher-functional alcohols, often not all of the hydroxyl groups are esterified. The polyfunctional acrylic esters are reacted with hydrogen sulfide or with the polyfunctional mercaptan in such a molar ratio that there is at least one mol of the polyfunctional acrylic ester for each hydrogen atom bound to sulfur. A limited excess of the polyfunctional acrylic ester is not disadvantageous because the double bond equivalent weight of the binder is reduced, the viscosity is lowered, and the formation of higher condensation products is suppressed. The portion of unreacted polyfunctional acrylic esters in the binder can amount, for example, up to 50 percent by weight. To the extent these esters are volatile and have a disturbing characteristic odor, the amount of the ester clearly should be held below this limit.

The oligomers shown earlier herein by formula have a molecular weight between 370 and 1000. Since, as a rule, mixtures of products are usually obtained, especially when polymercaptan reagents are employed, these molecular weight limits should be understood to be average molecular weights. Similarly, the oligomers should have an (average) double bond equivalent weight of at most 500. Oligomers of higher molecular weight are highly viscous or solid and thus are not suitable as binders. The coating agent and binders according to the invention are liquid at room temperature. Their viscosity at 20° C. should not exceed 100,000 mPa s. The preferred viscosity is 5,000 to 70,000 mPa s at 20° C., measured with a rotation viscosimeter.

All known ultraviolet initiators can be used for the hardening of the new coating agent and binders under the influence of ultraviolet radiation. Conventional ultraviolet initiators are, for example, benzophenone; benzoin ether; ω-halogenated ketones, e.g. trichloroacetophenone; benzildialkyl ketals; thioxanthone derivatives; hydroxyalkyl phenones; and diethoxy acetophenone.

The initiators are used in conventional amounts, which as a rule are between 0.1 and 10 percent, preferably from 2 to 5 percent, by weight of the oligomeric compounds. Hardening is initiated with ultraviolet radiation having a wavelength from 250–400 nanometers which can, for example, be generated with a mercury-high pressure lamp. The period of irradiation required for complete hardening is, for nonpigmented coatings, from 0.1 to 10 seconds depending on layer thickness. Pigmented systems require a substantially longer period of radiation. Hardening can be carried out in air.

The coating agents and binders according to the invention can be used, after the addition of an ultraviolet initiator, for the preparation of clear coatings without further additives. Often, they are combined with other binders, above all with those which are also hardenable by ultraviolet radiation. As an example, polyvalent acrylic esters have already been mentioned. The latter can be derived from an excess thereof used in the preparation of the oligomers or can be added subsequently. Also, other free radically polymerizable mono- or polyfunctional monomers of high boiling point which are miscible with the oligomers can be used therewith, for example alkoxyalkyl acrylates or methylene bisacrylamide. These compounds of low molecular weight have much lower viscosities than the oligomers and can be added for adjusting the viscosity of the total mixture.

By the addition of dyes, pigments, fillers, and/or other conventional auxiliary agents, lacquers, printing inks, or coating compounds for many uses are obtained. According to the additives employed, the coatings are either glossy, semi-matte, or matte.

The new coating agents and binders are generally applied to the substrate to be coated in a layer thickness from 0.5 to 20 microns and as a rule are hardened directly thereafter. Every conventional application technique can be used, for example spraying, pouring, dipping, roller application, application with a doctor blade, or printing. As substrates, all solid materials come into consideration, particularly materials having a large area. After hardening, closed coatings are often rather brittle and in this case are predominantly suitable for use on substrates of limited flexibility. Suitable substrates include, among other materials, metals such as steel, aluminum, or copper, particularly in the form of sheets or foils, wood in the form of plywood, veneer, or chipboard, paper, cardboard, pasteboard, synthetic resins in the form of sheets, shaped bodies, or films, in which case they can, for example, act as a plasticizer barrier.

A better understanding of the present invention and of its many advantages will be had by referring to the following specific Examples, given by way of illustration.

EXAMPLE 1

296 g of trimethylolpropane triacrylate are introduced into a reaction flask and heated to 50° C. Already during the heating phase, hydrogen sulfide is introduced to the point of saturation.

After continuous addition of 0.56 g of ethanolic sodium hydroxide solution as a catalyst, the absorption of hydrogen sulfide increases and the reaction temperature rises above 60° C.

The most advantageous temperature region is between 53° C. and 55° C. After 3-4 hours, 11.2 liters of hydrogen sulfide are reacted. The viscous adduct is stirred for one hour at 70° C. and, after the addition of 3 g of 85 percent phosphoric acid, the adduct is degassed at a temperature of at most 70° C. under the vacuum created by water aspirator.

| | |
|---|---|
| Viscosity: | 23,500 mPa s (23° C.) |
| Odor: | ester-like |
| Appearance: | honey-yellow, almost clear |
| Sulfur content: | 4.5% |
| Average molecular weight (MW): | 715 |
| Average double bond equivalent weight (DBEW): | 146 |

EXAMPLE 2

The procedure follows that of Example 1.

| | |
|---|---|
| Batch: | 226 g of 1,6-hexanedioldiacrylate, 11.2 liters of hydrogen sulfide, and 4.0 ml of triethylamine. |
| Viscosity: | 18 sec. in a 4 mm-DIN-beaker (23° C.) |
| Odor: | odorless |
| Appearance: | light yellow, clear |
| Sulfur content: | 6.0% |
| Average MW: | 533 |
| Average DBEW: | 260 |

EXAMPLE 3

The method is that of Example 1.

| | |
|---|---|
| Batch: | 251 g of pentaerythritol tetraacrylate (3.3 acrylate groups per molecule) 9.0 liter of hydrogen sulfide and 4.5 ml of triethylamine |
| Viscosity: | 68,000 mPa s (23° C.) |
| Odor: | odorless |
| Appearance: | colorless, clear |
| Sulfur content: | 3.8% |
| Average MW: | 840 |
| Average DBEW: | 130 |

EXAMPLE 4

200 g of trimethylolpropane triacrylate are introduced into a reaction vessel together with 0.4 ml of triethylamine. 24.2 g of pentaerythritol-tetrakis-mercaptoacetic acid ester are added dropwise at room temperature. After reaching the maximum reaction temperature of 35° C., the batch is stirred for two hours at 50° C. Subsequently, 13 g of 2-hydroxypropyl acrylate together with 0.4 ml of triethylamine are added dropwise at 50° C. and thereafter the batch is stirred for an additional hour at this temperature.

0.8 g of 85% of phosphoric acid is added to the viscous product.

| | |
|---|---|
| Viscosity: | 7,100 mPa s (23° C.) |
| Appearance: | brown, clear |
| Average MW: | less than 1000 |
| Average DBEW: | 125 |

Following Examples 5-14 relate to the use of the coating agents and binders of the invention.

The coating agents and binders prepared according to the foregoing Examples, optionally in combination with other hardenable monomers or with pigments, are combined (to the extent not otherwise indicated) with 5 percent, by weight of the binder, of benzildimethyl ketal as an ultraviolet initiator and are applied with the doctor blade in a layer thickness of about 10 microns on art paper and are hardened by passing the coated paper under two mercury-high pressure lamps having an output of 80 watts/cm. By a gradual increase in the velocity of the paper train as it passes the exposure station, in each case the highest rate ($v_{max}$) is determined at which dry and hard films are still produced.

EXAMPLE 5

100 parts of the oligomer from Example 1.
$v_{max} = 100$ meters/minute

EXAMPLE 6

90 parts of the oligomer from Example 1 and 10 parts of trimethylolpropane triacrylate.
$v_{max} = 80$ m/min.

EXAMPLE 7

90 parts of the oligomer from Example 1 and 10 parts of 1,6, -hexanediol diacrylate.
$v_{max} = 60$ m/min.

EXAMPLE 8

90 parts of the oligomer of Example 1 and 10 parts of 2-hydroxypropyl acrylate.

$v_{max}=70$ m/min.

EXAMPLE 9

100 parts of the oligomer of Example 3.
$v_{max}=130$ m/min.

EXAMPLE 10

70 parts of the oligomer from Example 3 and 30 parts of trimethylolpropane triacrylate
$v_{max}=80$ m/min.

EXAMPLE 11

100 parts of the oligomer of Example 4
$v_{max}=100$ m/min.

EXAMPLE 12

100 parts of the oligomer of Example 1 and 10 parts of yellow pigment ("Irgalith Yellow BAW").
Layer thickness: 2–4 microns.
$v_{max}=90$ m/min.

EXAMPLE 13

100 parts of the oligomer of Example 1 and 10 parts of blue pigment ("Sandorin Blue 2 GLS"S).
Layer thickness: 2–4 microns.
$v_{max}=60$ m/min.

EXAMPLE 14

50 parts of the oligomer of Example 1,
50 parts of titanium dioxide, and
11 parts of UV-initiator system comprising 2-isopropylthioxanthone, dimethylneopentanolamine, and hydroxybenzophenone.
Layer thickness: 1–2 micron, $v_{max}=150$ m/min.
Layer thickness: 15–20 micron, $v_{max}=150$ m/min.

The system used in Example 14 comprising a thioxanthone compound, a different conventional UV-initiator, and a secondary or tertiary amine is particularly advantageous for highly pigmented coating masses.

What is claimed is:

1. A liquid coating agent and binder, hardenable under the influence of ultraviolet radiation, comprising at least one oligomer of the formula $$[(CH_2\!\!=\!\!CHCOO)_mROOCC_2H_4]_2S$$

wherein
R is an (m+1)-valent aliphatic group having 2 to 12 carbon atoms and is an aliphatic hydrocarbon group or two or more of such groups joined pairwise by an oxygen atom to form an ether or polyether and
m is an integer from 1 to 3,
said oligomer or oligomers having an average molecular weight between 370 and 1000 and an average double bond equivalent weight of at most 500.

2. A coating agent and binder as in claim 1 having a viscosity from 5000 to 70000 mPa s at 20° C.

3. A coating agent and binder as in claim 1 which additionally comprises a free-radically polymerizable monomer as a further hardenable component.

4. A coating and binding agent as in claim 1 which additionally comprises an ultraviolet sensitive polymerization initiator.

5. A coating and binding agent as in claim 4 wherein said ultraviolet sensitive polymerization initiator is a combination of a thioxanthone compound, a different conventional ultraviolet sensitive polymerization initiator, and a secondary or tertiary amine.

* * * * *